United States Patent [19]

Yamamoto et al.

[11] Patent Number: 4,561,190
[45] Date of Patent: Dec. 31, 1985

[54] TWO-DIRECTIONAL TOUCH SENSOR

[75] Inventors: Takeshi Yamamoto; Hideo Sakata; Iwao Sugizaki, all of Kawasaki, Japan

[73] Assignee: Mitutoyo Mfg. Co., Ltd., Tokyo, Japan

[21] Appl. No.: 557,293

[22] Filed: Nov. 22, 1983

[30] Foreign Application Priority Data

Mar. 31, 1982 [JP] Japan .................................. 57-52825

[51] Int. Cl.⁴ .............................................. G01B 7/28
[52] U.S. Cl. .................... 33/561; 33/169 R; 33/172 E
[58] Field of Search ............ 33/169 R, 169 C, 172 E, 33/172 B, 174 L, 23 K, 559, 561, 556, 557, 558, 503; 409/128, 126, 127

[56] References Cited

U.S. PATENT DOCUMENTS 3,235,222  2/1966  Nickell .............................. 33/23 K
3,922,791 12/1975  Maxey et al. ...................... 33/174 L

FOREIGN PATENT DOCUMENTS 899268 12/1953 Fed. Rep. of Germany .... 33/172 E
1183412  1/1959 France .............................. 33/172 E
  18629  6/1970 Japan ............................... 33/172 B
  49865  4/1977 Japan .
  88754  1/1978 Japan .
  86157  1/1979 Japan .
  53401  7/1981 Japan .

Primary Examiner—Harry N. Haroian
Attorney, Agent, or Firm—Flynn, Thiel, Boutell & Tanis

[57] ABSTRACT

A two-directional touch sensor for use in a height gauge, other measuring instruments or the like, wherein an abutting contact with a workpiece (W) to be measured is detectable in two directions opposed to each other at 180°. The main body (1) of sensor has a probe shaft (13) rotatably supported by the main body (1) and provided at one end with a spherical measuring element (18) and at the other end with a contacting element (20). When an abutting point (18A) or (18B) of the measuring element (18) being in abutting contact with the workpiece (W) is aligned with a neutral axis (M), the contacting element (20) comes into contact with either one of electric contact points (54B) and (54A) to emit a touch signal.

16 Claims, 4 Drawing Figures

TWO-DIRECTIONAL TOUCH SENSOR

DESCRIPTION

1. Field of the Invention

This invention relates to a two-directional touch sensor for electrically detecting contact with a workpiece to be measured or the like.

2. Background of the Art

In the measuring instruments such as a height gauge, there has generally been used a touch sensor having a high degree of accuracy to detect contact between a probe and a workpiece.

The known touch sensors are constructed so as to be operable in two directions as disclosed in Japanese Utility Model Kokai (Laid-Open) No. 86157/79 for example. However, a disadvantage with the known construction arises when the direction of operation is changed during the measurement. A surface of the spherical measuring element being in contact with the workpiece to be measured is shifted by a diametrical length of the measuring element, thus causing an error depending upon the direction of operation. Because of this, in use of the above-described sensors, the mode of operation must be limited to only one direction, or a computer must be introduced for effecting a correction of a length equivalent to a radius of the measuring element.

Sensor circuits of the known touch sensors are of such an arrangement that, when the measuring element comes into contact with the workpiece or the like, the circuit is opened, that is, the circuit is normally closed, whereby the power consumption is comparatively high, so that the known sensor circuit cannot easily be adopted in compact battery-driven type measuring instruments in particular.

It is the object of the present invention to provide a two-directional touch sensor capable of avoiding an error due to the operating direction and minimizing the power consumption.

SUMMARY OF THE INVENTION

To achieve the above-described object, the present invention contemplates that the probe shaft provided at one end thereof with a spherical measuring element and at the other end thereof with a contacting element is rotatably supported on a main body of the sensor, a position control means is provided for holding this probe shaft on a neutral axis, a pair of electric contact points are disposed in the path of motion of the contacting element and are spaced a predetermined distance apart from each other having interposed therebetween the contacting element; and, when a surface portion of the measuring element abuts against a workpiece to be measured, tangentially related to the neutral axis, the contacting element comes into contact with one of the pair of electric contact points, whereby an error due to the operating direction is eliminated, and at the same time, the contacting element and the electric contact point come into contact with each other to close a sensing means for minimizing the power consumption.

DETAILED DESCRIPTION OF THE PREFERRED EMBODIMENT

Description will hereunder be given of one embodiment of the present invention with reference to the drawings.

Figure 1:
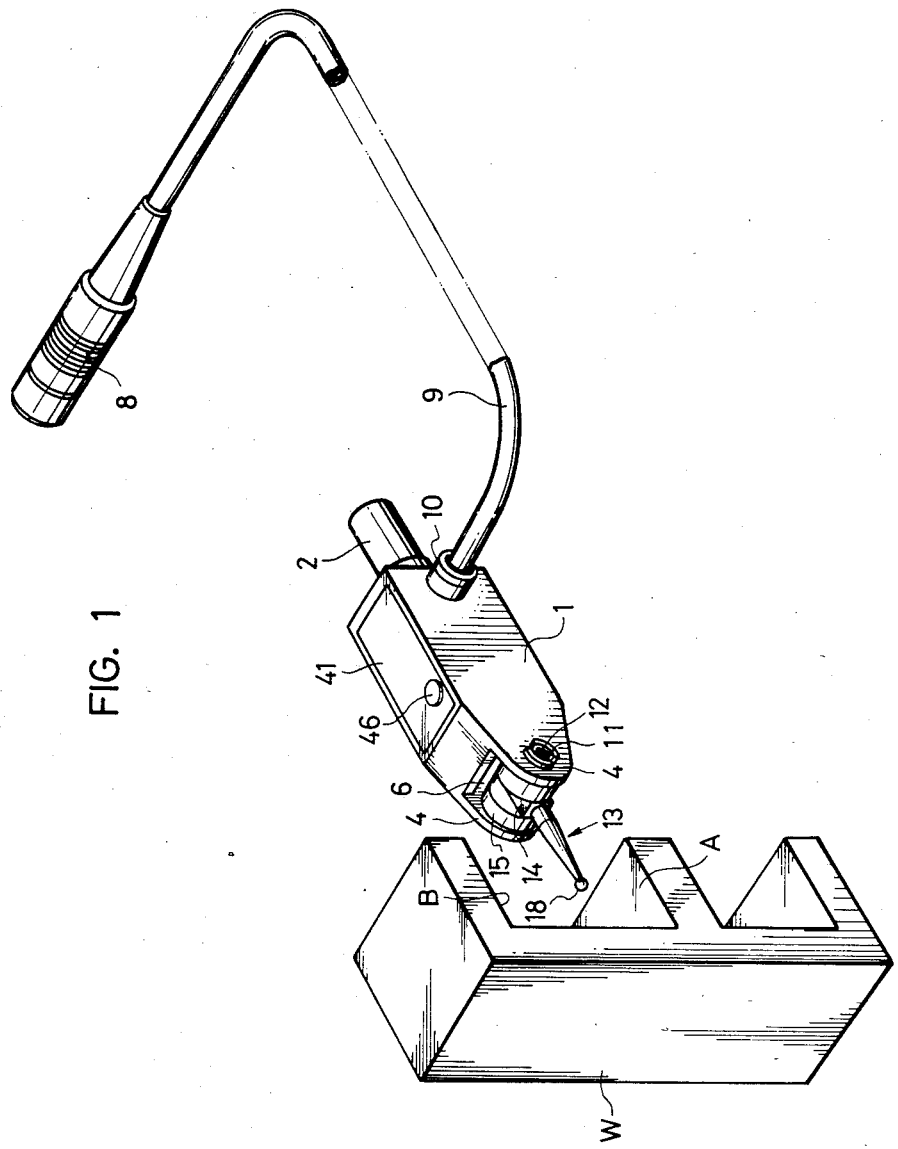
FIG. 1 is a perspective view showing an outer appearance of one embodiment of the present invention.
Figure 2:
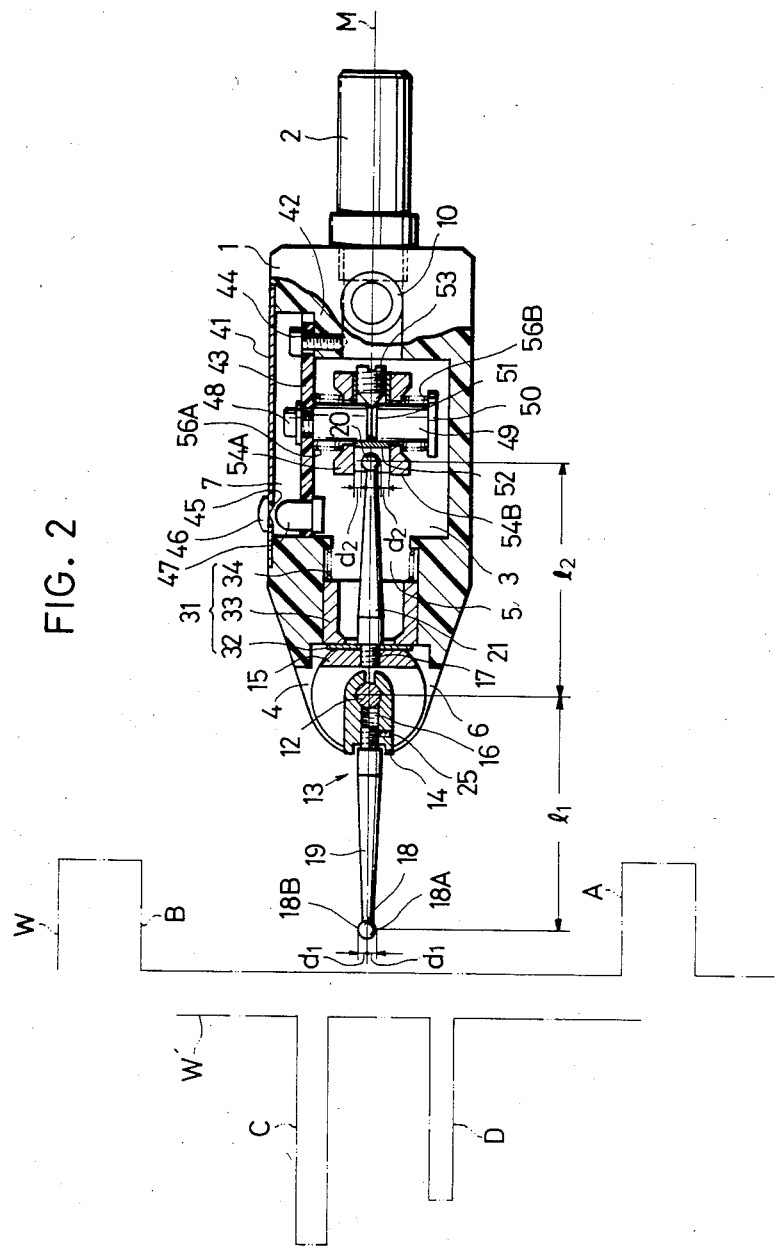
FIG. 2 is a sectional view thereof.

In FIGS. 1 and 2, a main body 1 is generally made of an electrically insulating material, formed into a substantially square pillar shape, and provided at the upper and lower surfaces of the forward portion thereof with tapered surfaces tapering off toward the front. Furthermore, the main body 1 is projectingly provided at the rear end face thereof with a shank 2 to be mounted to a slider of a measuring instrument for example, and projectingly provided at one side surface thereof with a retainer tube 10 for receiving a cord 9 provided at the forward end with a plug 8. Further, the main body 1 is formed therein with a vacant space 3, provided at the forward end portion thereof between side opposing walls 4 with a cut-away portion 6 communicating with the vacant space 3 through a sliding guide hole 5, and formed at the upper surface thereof with an opening 7 communicating with the space 3.

Rotatably supported across the aforesaid opposing side walls 4 is a pivot 12, opposite end portions of which are extended through the opposing side walls 4, projected from opposite side surfaces of the main body 1 and locked against dislodging by nuts 11. A probe shaft 13 is mounted on this pivot 12 at a portion thereof located in the cut-away portion 6. The probe shaft 13 comprises: a first retainer member 14 mounted on the pivot 12 in a manner to be rotatable and fixable by a screw, not shown; and a second retainer member 15 adapted to clamp the first retainer member 14 from opposite sides and mounted on the pivot 12 in a manner to be rotatable and fixable by a screw, not shown. These first and second retainer members 14 and 15 are respectively formed therethrough with threaded portions 16 and 17 which perpendicularly intersect the pivot 12 and have openings directed in directions opposed to each other. The threaded portion 16 is threadably, detachably coupled thereto with a measuring element shaft 19 provided at the forward end thereof with a spherical measuring element 18. The threaded portion 17 is threadably, detachably coupled thereto with a contacting element shaft 21 provided at the forward end thereof with a contacting element 20. These first and second retainer members 14 and 15, the measuring element shaft 19 and the contacting element shaft 21 constitute the probe shaft 13. Here, the measuring element shaft 19 and the contacting element shaft 21 are aligned with each other on a straight line, and their center axes are supported by a position control means 31 in a manner to be aligned with the neutral axis M. Furthermore, the measuring element shaft 19 is solidly secured to the second retainer member 14 by means of a set screw 25. This set screw 25 is loosened and a threadably coupled value of the measuring element shaft 19 to the threaded portion 16 is adjusted so as to adjust the position of the measuring element 18 relative to the pivot 12.

The position control means 31 comprises: an engageable piece 32 provided perpendicularly to the center axis of the probe shaft 13 between the second retainer member 15 of the probe shaft 13 and the contacting element shaft 21; a biasing member 33 slidably provided in the sliding guide hole 5; and a spring 34 biasing the biasing member 33 toward the engageable piece 32.

The opening 7 is provided with a cover plate 41. A support plate 43 made of an electrically insulating material is solidly secured through a screw 44 to a stepped portion disposed between the space 3 and the opening 7. The cover plate 41 is formed therein with a window hole 45, to which is coupled a light-transmitting cap 46. The support plate 43 is mounted thereto with a display element 47 such as a light emission diode disposed at a position opposed to the window hole 45. Further, a guide shaft 49 made of an electrically insulating material is mounted through a screw 48 to the substantially central portion of the support plate 43 in the space 3, perpendicularly intersecting the aforesaid neutral axis M.

Figure 3:
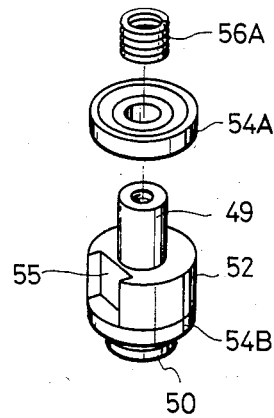
FIG. 3 is a perspective view showing the construction of mounting a pair of contact plates.

The guide shaft 49 is formed at the bottom end thereof with a collar 50 having a somewhat large diameter, and at the intermediate portion thereof with an annular V-groove 51, respectively. Further, a spacer member 52 provided around the annular groove 51 is solidly secured to the guide shaft 49 through a set screw 53, the forward end of which is engaged with the annular groove 51. Furthermore, contact plates 54A and 54B made of an electrically conductive material as being a pair of electrical contact points are slidably coupled onto the guide shaft 49, interposing the spacer member 52 from above and below. The spacer member 52 is formed at the front side portion with a cut-away portion 55 in the moving direction of the contacting element 20 of the probe shaft 13, that is, in the axial direction of the guide shaft 49 as shown in FIG. 3. Further, the pair of contact plates 54A and 54B are biased toward the spacer member 53 by a spring 56A confined between the support plate 43 and the upper contact plate 54A and a spring 56B confined between the collar 50 and the lower contact plate 54B, respectively. Here, the thickness of the spacer member 52 is determined such that a distance $d_2$ from the respective contact plates 54A, 54B to the spherical surface of the contacting element 20 is represented by the following equation.

$$d_2 = l_2/l_1 \cdot d_1 \qquad (1)$$

where $l_1$ is a distance from the fulcrum of rotation of the probe shaft 13, i.e., the pivot 12 to the center of the measuring element 18, $l_2$ is a distance from the pivot 12 to the center of the contacting element 20, and $d_1$ is the radius of the measuring element 18.

With this arrangement, when the probe shaft 13 is rotated about the pivot 12 and an abutting contact 18A or 18B on the spherical surface of the measuring element 18, which is in abutting contact with a workpiece W is aligned with the neutral axis M, the contacting element 20 just comes into contact with the contact plate 54A or 54B, so as to close a circuit of a sensor means 61.

Figure 4:
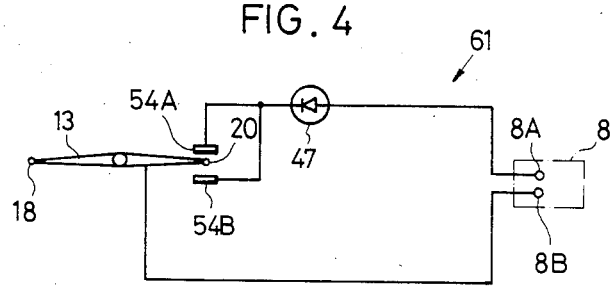
FIG. 4 is a circuit diagram showing a sensing means.

As shown in FIG. 4, in the sensor means 61, one of the terminals 8A of the plug 8 is connected through the display element 47 to the pair of contact plates 54A and 54B, respectively, and the other 8B of the terminals is connected to the probe shaft 13 capable of approaching or receding from one of the pair of contact plates 54A and 54B. When the contacting element 20 of the probe shaft 13 comes into contact with either the contact plate 54A or 54B, the display element 47 is turned "ON", and a contact signal so emitted is then fed to a component such for example as a control section of a measuring instrument, which is connected through the plug 8.

OPERATION

Description will hereunder be given of the operation action of this embodiment.

Now, in the case of measuring a length between surfaces A–B of the workpiece W to be measured as shown in the drawing or an absolute length from a predetermined original point to the surfaces A–B by use of this touch sensor, the shank 2 of the main body 1 is secured to the slider of a measuring instrument, not shown, and this touch sensor is moved downwardly by the operation of the slider in FIGS. 1 and 2. The measuring element 18 of the probe 13 is abutted against the surface A to be measured due to this movement, and thereafter, if the measuring element 18 is further moved downwardly, then the probe shaft 13 is rotated about the pivot 12 in the clockwise direction in FIG. 2, while compressing the spring 34.

Here, if a tangent line of the measuring element 18 is aligned with the neutral axis M, that is, an abutting point 18A of the measuring element 18 abutting against the surface A to be measured is aligned with the neutral axis M, then the contacting element 20 of the probe shaft 13 comes into contact with the contact plate 54B. Then, the circuit in the sensor means 61 is closed, whereby the display element 47 is turned "ON", and simultaneously, a contact signal is delivered to the measuring instrument. By this, in the measuring instrument, a length from the original point to the surface A to be measured is displayed on the basis of the movement value of the slider. In consequence, the measuring element 18 is abutted against the surface A to be measured, and further, a movement value before the abutting point 18A comes to the neutral axis M can be measured, so that there is no need to correct an error corresponding to the radius of the measuring element 18. Furthermore, the circuit in the sensor means 61 is opened by this time, so that the power consumption of the sensor means 61 can be saved.

Then, upon ascertaining the turn "ON" of the display element 47 due to a closing of the circuit in the sensor means 61, a measurer stops the operation of the slider. However, since, actually, it is difficult to stop the operation of the slider at the same time as the closing of the circuit in the sensor means 61, the probe shaft 13 is further rotated in the clockwise direction in FIG. 2. At this time, the contact plate 54B brought into contact with the contacting element 20 of the probe shaft 13 moves downwardly in FIG. 2 against the resiliency of the spring 56B, so that the workpiece W and this touch sensor are prevented from being damaged. Furthermore, the contacting element 20 still remains in contact with the contact plate 54B, so that a malfunction signal due to chattering, etc. can be prevented from occurring.

Now, after the above-described measuring work, when the measurer returns this touch sensor upwardly in FIGS. 1 and 2 by the operation of the slider of the measuring instrument, the probe shaft 13 is rotated through the resiliency of the spring 34 in the counter-clockwise direction in FIG. 2, and, after the measuring element 18 is separated from the surface A to be measured, the center axis of the measuring element 18 is held in a state of being aligned with the neutral axis M. Furthermore, as the probe shaft 13 is rotated, the contact plate 54B is moved through the resiliency of the spring 56B toward the spacer member 52, and, the contact plate 54B is held at a prescribed position spaced a distance $d_2$ apart from the spherical surface of the contacting element 20 by the spacer member 52.

The foregoing description is true of the case of abutting the measuring element 18 against the surface B to be measured. More specifically, this touch sensor is moved upwardly in FIGS. 1 and 2, after the measuring element 18 of the probe shaft 13 is abutted against the surface B to be measured, and, if this touch sensor is moved further upwardly, then the probe shaft 13 is rotated about the pivot 12 in the counterclockwise direction in FIG. 2. Here, when the abutting point 18B of the measuring element 18 abutting against the surface B to be measured is aligned with the neutral axis M, the contacting element 20 of the probe shaft 13 comes into contact with the contact plate 54A, whereby the circuit in the sensor means 61 is closed.

In consequence, regardless of the rotating direction of the probe shaft 13, that is, the operating directions thereof, when either one of the two abutting points 18A and 18B of the measuring element 18 reaches the neutral axis M, a contact signal can be obtained, there is no need for correcting the error corresponding to the radius of the measuring element 18.

On the other hand, when deep holes C and D of a workpiece W' as shown in FIG. 2 are measured, the measuring element shaft 19 of the probe shaft 13 is removed from the first retainer member 14, and a long measuring element shaft 19 separately prepared is secured to the first retainer member 14, so that the measurement of these deep holes can be conducted. In this case, the measuring element shaft 19 separately prepared is formed such that the dimeter of the measuring element 18 is increased with the increase in length of the measuring element shaft 19, so that the aforesaid equation (1) may be satisfied.

When the inner diameters of deep holes C and D are small, the diameter of the measuring element 18 is not increased with the increase in length of the measuring element shaft 19. Instead, the thickness of the spacer member 52 is selected accordingly, so that the equation (1) may be satisfied.

In consequence, according to the present embodiment, the probe shaft 13 provided at one end thereof with the spherical measuring element 18 and at the other end thereof with the spherical contacting element 20 is rotatably supported on the main body 1 of sensor, the position control means 31 is provided for holding the center axis of this probe shaft 13 to align with the neutral axis M, the pair of electric contact plates 54A and 54B are disposed in the moving directions of the contacting element 20, and, when one of the abutting points 18A and 18B, where the measuring element 18 abuts against the surface to be measured, is aligned with the neutral axis M, the contacting element 20 comes into contact with one of the pair of contact plates 54A and 54B so as to close the circuit in the sensor means 61, so that the workpiece W can be always detected on the neutral axis M regardless of the rotating direction of the probe shaft 13, that is, the abutting direction of the measuring element 18, thereby enabling an elimination of error due to the operating directions. In consequence, necessity is eliminated for the provision on the measuring instrument of the function of correcting the error corresponding to the radius of the measuring element 18, so that the sensor can be manufactured at low costs.

The circuit in the sensor means 61 is opened until either one of the abutting points 18A and 18B of the measuring element 18 reaches the neutral axis M, so that the power consumption of the sensor means 61 can be reduced.

The engageable piece 32 is disposed perpendicularly to the probe shaft 13, the biasing member 33 is provided on the main body 1 in a manner to be slidable along the neutral axis M, and this biasing member 33 is biased toward the engageable piece 32 by the spring 34, whereby the probe shaft 13 can be held in such a manner that the center axis thereof is aligned with the neutral axis M, so that the probe shaft 13 is not restricted by the posture of the main body 1 being mounted to the measuring instrument or the like. Moreover, the biasing force of the spring 34 is associated with the measuring force, so that a desired measuring force can be selected through the change in the biasing force of the spring 34.

The interval across the pair of contact plates 54A and 54B is defined by the thickness of the spacer member 52, so that the distance $d_2$ from either one of the contact plates 54A and 54B to the spherical surface of the contacting element 20 can satisfy the aforesaid equation (1) where $l_1$ is the distance from the fulcrum of rotation of the probe shaft 13, i.e., the pivot 12 to the center of the measuring element 18, $l_2$ is the distance from the pivot 12 to the center of the contacting element 20, and $d_2$, is the radius of the measuring element 18, so that a contact signal can be always obtained at an accurate position. Moreover, the display element 47 is turned "ON" in response to the contact signal, so that an excessive over-run can be avoided.

Even if an over-run occurs, the pairs of contact plates 54A and 54B can be relieved against the resiliency of the springs 56A and 56B, so that damage to the workpiece and the touch sensor can be prevented. Further, in that case, the contacting element 20 of the probe shaft 13 and the contact plate 54A or 54B still remain in contact with each other owing to the resiliency of the springs 56A and 56B, a malfunction signal due to chattering and the like can be prevented from occurring.

The measuring element shaft 19 of the probe shaft 13 is detachable, so that the replacement of the measuring element shaft 19 with a new one enables to conduct the measuring even when the surfaces to be measured are in a deep hole or a small-diameter hole. In this case, the diameter of the measuring element 18 or the thickness of the spacer member 52 can be varied in accordance with the length of the measuring element shaft 19, whereby the replacement of the measuring element shaft 19 does not cause an error.

Further, the set screw 25 is loosened to adjust the threadably coupled value of the set screw into the threaded portion 16 of the measuring element shaft 19, whereby the position of the measuring element 18 with respect to the pivot 12 can be adjusted, so that the distance $l_1$ can be desirably set from outside to easily satisfy the aforesaid equation.

In working, the sensor means 61 may be constructed such that the circuit from the probe shaft 13 to the terminal 8B may be replaced by one from the probe shaft 13 to the terminal 8B through the workpiece W. In FIG. 4, the upper and lower contact plates 54A and 54B need not necessarily be put together into one terminal, but, may be individually connected to terminals separate from each other through the display element, and these terminals may be connected to one of electrodes of the power source through the control section of the measuring instrument, so that judgment can be made whether the contact plate 54A or 54B is brought into contact with the contacting element 20, thus enabling to discriminate the direction of rotation of the probe shaft 13. Further, the measuring element 18 need not necessarily be spherical, but, may be symmetrical in the moving direction (vertical direction in FIG. 2) with respect to the neutral axis. Furthermore, the present invention is applicable to the case where a reciprocatory member is stopped at predetermined positions, respectively, and the like, for example, in addition to the case of the measuring instrument described in the above embodiment.

According to the present invention, a contact signal can be always obtained at a predetermined position regardless of the direction in which the measuring element abuts against the workpiece to be measured, so that the two directional touch sensor can be provided in which any error due to the operating direction does not occur and the power consumption is low.

INDUSTRIAL AVAILABILITY

The two-directional touch sensor according to the present invention is usable for stopping a reciprocatory member at predetermined positions in addition to securing it to a height gauge or other measuring instruments for measuring dimensions of the workpiece to be measured. In any way, the touch sensor is usable in the case where the measuring element of the touch sensor senses an abutting contact between the measuring element and a member movable relative to the measuring element so as to obtain some information, and is particularly effective in a position where the directions of relative movement are two directions opposite to each other at 180°. In this case, the touch sensor may be safely usable for one direction only.

The embodiments of the invention in which an exclusive property or privilege is claimed are defined as follows:

1. A two-directional touch sensor, comprising: a main body elongated in the direction of a neutral axis, an elongated probe shaft rotatably supported on said main body and for movement solely about a nonmovable axis of rotation perpendicular to said neutral axis and the longitudinal axis of said probe shaft, said probe shaft having at one end thereof a measuring element symmetrical with the axis of said probe shaft and at the other end thereof a contacting element, a position control means for holding said probe shaft in said main body in such a manner that the axis of said probe shaft is normally colinearly aligned with said neutral axis, a pair of electric contact points each provided on said main body and positioned in the path of movement of said contacting element of said probe shaft, said contact element being interposed between said electric contact points, and a sensor means for sensing electric conduction between either one of said electric contact points and said contacting element, wherein, when said measuring element is moved in either one of two directions so that a surface portion on said measuring element becomes tangentially related to said neutral axis, said electric contact points will electrically contact said contacting element, and wherein said measuring element has a spherical shape, the center of which coninicides with said longitudinal axis of said probe shaft, said contacting element having a pair of surface portions thereof spaced an equal distance from said longitudinal axis of said probe shaft, and wherein an equation $d_2 = l_2/l_1 \cdot d_1$ is satisfied, where $l_1$ is a distance from said axis of rotation of said probe shaft to the center of said measuring element, $l_2$ is a distance from said axis of rotation of said probe shaft to the center of said contacting element, $d_1$ is a radius of the measuring element, and $d_2$ is an interval between either one of the electric contact points and the contacting element.

2. A two-directional touch sensor as set forth in claim 1, wherein said measuring element has a spherical shape, the center of which coincides with said longitudinal axis of said probe shaft, said contacting element having a pair of surface portions thereof spaced an equal distance from said longitudinal axis of said probe shaft, and wherein an equation $d_2 = l_2/l_1 \cdot d_1$ is satisfied, where $l_1$ is a distance from said axis of rotation of said probe shaft to the center of said measuring element, $l_2$ is a distance from said axis of rotation of said probe shaft to the center of said contacting element, $d_1$ is a radius of the measuring element, and $d_2$ is an interval between either one of the electric contact points and the contacting element.

3. A two-directional touch sensor as set forth in claim 1, wherein said pair of electric contact points is held at opposite sides of a spacer member provided on said main body in a manner to be spaced apart from each other at an interval of satisfying said equation, and wherein means for biasing said electrical contact points so as to come into contact with said spacer element when said contacting element is free of engagement with said contact points.

4. A two-directional touch sensor as set forth in claim 3, wherein said position control means comprises an engageable piece disposed perpendicularly to said probe shaft, a biasing member provided on said main body in a manner to be movable along said neutral axis, and a spring for biasing said biasing member toward said engageable piece.

5. A two-directional touch sensor as set forth in claim 3, wherein of the two end portions of said probe shaft, namely, said measuring element and said contacting element, respectively, at least the end portion including said measuring element is detachably secured to a portion of said probe shaft rotatably supported on said main body.

6. A two-directional touch sensor as set forth in claim 3, wherein said measuring element is positionally adjustably secured to a portion rotatably supported on said main body.

7. A two-directional touch sensor as set forth in claim 3, wherein said position control means comprises an engageable piece disposed perpendicularly to said probe shaft, a biasing member provided on said main body in a manner to be movable along said neutral axis, and a spring for biasing said biasing member toward said engageable piece.

8. A two-directional touch sensor as set forth in claim 2, wherein of the two end portions of said probe shaft, namely, said measuring element and said contacting element, respectively, at least the end portion including said measuring element is detachably secured to a portion of said probe shaft rotatably supported on said main body.

9. A two-directional touch sensor as set forth in claim 2, wherein said measuring element is positionally adjustably secured to a portion rotatably supported on said main body.

10. A two-directional touch sensor as set forth in claim 1, wherein said position control means comprises an engageable piece disposed perpendicularly to said probe shaft, a biasing member provided on said main body in a manner to be movable along said neutral axis, and a spring for biasing said biasing member toward said engageable piece.

11. A two-directional touch sensor as set forth in claim 1, wherein of the two end portions of said probe shaft, namely, said measuring element and said contacting element, respectively, at least the end portion including said measuring element is detachably secured to a portion of said probe shaft rotatably supported on said main body.

12. A two-directional touch sensor as set forth in claim 11, wherein said measuring element is positionally adjustably secured to a portion rotatably supported on said main body.

13. A two-directional touch sensor as set forth in claim 1, wherein said measuring element is positionally adjustably secured to a portion of said probe shaft rotatably supported on said main body.

14. A two-directional touch sensor, comprising: a main body elongated in the direction of a neutral axis, an elongated probe shaft rotatably supported on said main body and for movement about an axis of rotation perpendicular to said neutral axis and the longitudinal axis of said probe shaft, said probe shaft having at one end thereof a measuring element symmetrical with the axis of said probe shaft and at the other end thereof with a contacting element, a position control means for holding said probe shaft in said main body in such a manner that the axis of said probe shaft is normally parallel with said neutral axis, a pair of electric contact points each provided on said main body and positioned in the path of movement of said contacting element of said probe shaft, said contact element being interposed between said electric contact points, and a sensor means for sensing electric conduction between either one of said electric contact points and said contacting element, wherein, when said measuring element is moved in either one of two directions so that a surface portion on said measuring element becomes tangentially related to said neutral axis, said electric contact points will electrically contact said contacting element, and wherein said position control means comprises an engageable piece disposed perpendicularly to said probe shaft, a biasing member provided on said main body in a manner to be movable along said neutral axis, and a spring for biasing said biasing member toward said engageable piece.

15. A two-directional touch sensor as set forth in claim 4, wherein of the two end portions of said probe shaft, namely, said measuring element and said contacting element, respectively, at least the end portion including said measuring element is detachably secured to a portion of said probe shaft rotatably supported on said main body.

16. A two-directional touch sensor as set forth in claim 1, wherein said measuring element is positionally adjustably secured to a portion rotatably supported on said main body.

* * * * *

UNITED STATES PATENT AND TRADEMARK OFFICE
CERTIFICATE OF CORRECTION

PATENT NO. : 4 561 190

DATED : December 31, 1985

INVENTOR(S) : Takeshi TAMAMOTO et al

It is certified that error appears in the above-identified patent and that said Letters Patent is hereby corrected as shown below:

Please cancel Claim 2 (Column 8, lines 5 to 18)

Column 8, line 29; change "3" to ---1---

Please renumber Claims 3 & 4 as Claims 2 & 3, respectively.

Please enter the following claim:

---4. A two-directional touch sensor as set forth in Claim 3, wherein said pair of electric contact points are movable in the moving direction of said contacting element.--- line 36; change "3" to ---1---.
        line 43; change "3" to ---4---.
        line 47; change "3" to ---2---.
        line 61; change "2" to ---14---.
        line 65; change "1" to ---4---.
Column 9, line 4; change "1" to ---4---.
        line 11; change "11" to ---2---.

UNITED STATES PATENT AND TRADEMARK OFFICE
CERTIFICATE OF CORRECTION

PATENT NO. : 4,561,190

DATED : December 31, 1985

INVENTOR(S) : Takeshi TAMAMOTO et al

It is certified that error appears in the above-identified patent and that said Letters Patent is hereby corrected as shown below:

Column 10, line 19; change "4" to ---14---.

line 26; change "1" to ---5---.

Signed and Sealed this

Seventeenth Day of November, 1987

*Attest:*

DONALD J. QUIGG

*Attesting Officer*      *Commissioner of Patents and Trademarks*